Patented June 19, 1928.

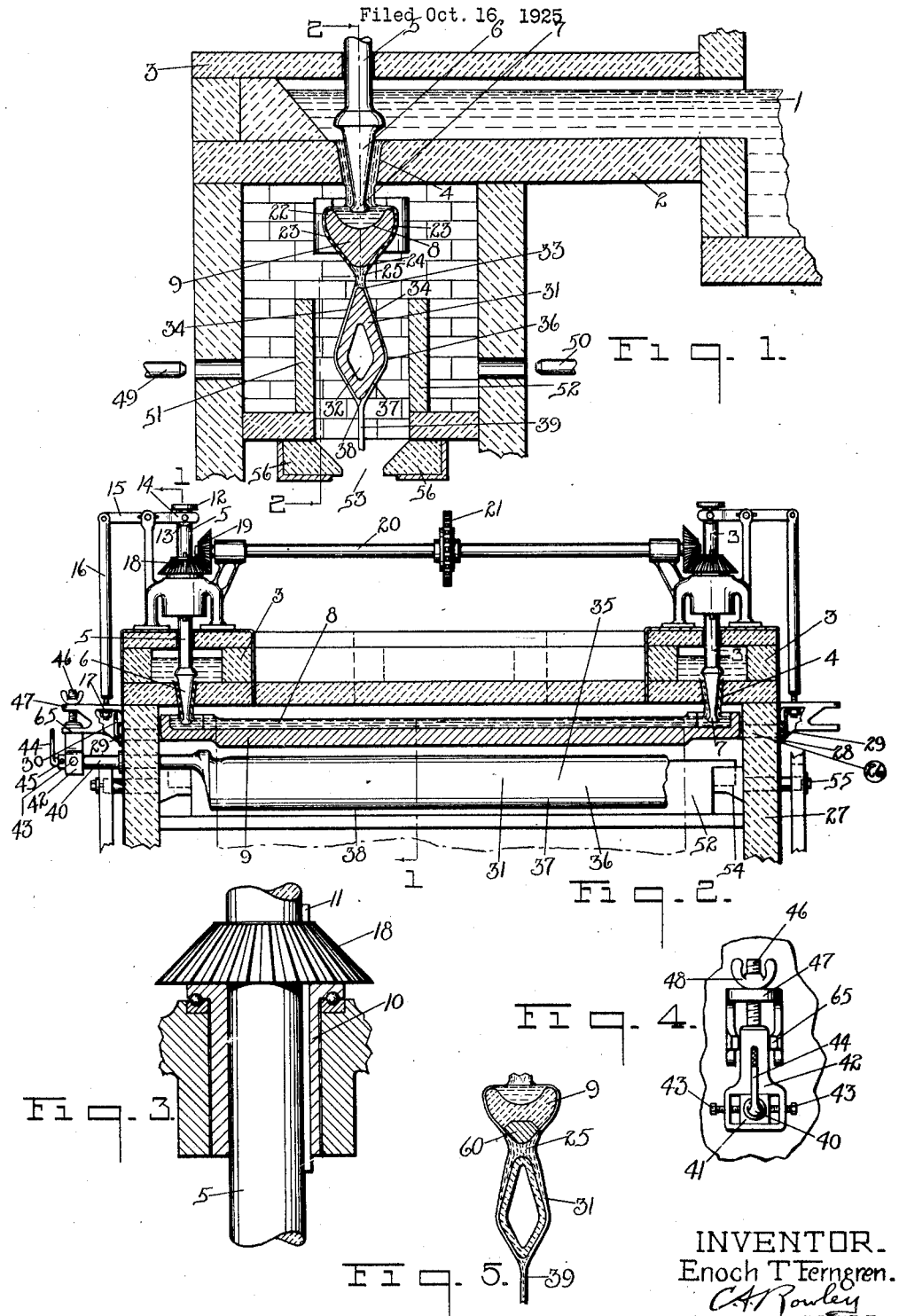

1,673,907

UNITED STATES PATENT OFFICE.

ENOCH T. FERNGREN, OF TOLEDO, OHIO, ASSIGNOR TO THE LIBBEY-OWENS SHEET GLASS COMPANY, OF TOLEDO, OHIO, A CORPORATION OF OHIO.

METHOD AND APPARATUS FOR FORMING CONTINUOUS SHEET GLASS.

Application filed October 16, 1925. Serial No. 62,871.

This invention relates to improvements in the art of producing sheet glass, and more particularly to an improved process and apparatus for flowing glass downwardly over a plurality of directing and supporting members from which the molten glass is drawn away in sheet form. This application has been filed for and is a substitution of application Serial No. 694,929, filed Sept. 23, 1924 which became abandoned.

In drawing a sheet of glass downwardly from a supplying flow, which is retarded in its vertical descent by the walls of a slotted orifice, or by the walls of a clay slab around which the supplying flow is spread, streaks or striations are apt to develop in the glass sheet, as well as a multitude of fine lines running in the direction in which the sheet is drawn. The clay parts over which the glass is drawn will gradually dissolve and crumble under the chemical action and the drawing strain, and the material pulled away from these parts will be drawn into the sheet.

When drawing through a slotted orifice, the glass clinging to the clay walls picks up alloy and additional silica which tends to produce an exceedingly tough glass adjacent to the clay wall of the orifice, which glass will be pulled downwardly along the side walls of the orifice and cause striations in the surface layer of the sheet. When the sheet is drawn from a supplying flow which descends along the exterior of a clay slab, the same phenomena will develop but not to such a marked degree, since the stress lines within the glass formed by the pull on the submerged glass adjacent the clay surface will be covered by the exterior glass flowing thereover, and will not always be communicated to the surface glass of the sheet. It may be seen in both instances cited that the injury done to the glass sheet is caused by transmission of drawing force to the glass which is more intimately associated with or clings to the clay members over which the glass passes.

According to the present invention, the molten glass flows from an extension of the tank or other container in which the molten glass is produced, down around an improved type of guiding and regulating member into a trough or recess in the top of an upper directing member or spill-bar. The glass overflows from this trough in even streams down around the two sides of the spill-bar, these streams uniting at the lower edge of the spill-bar to form a single thick stream which is delivered to the upper surface of a second directing member positioned below the spill-bar.

This lower member is preferably formed of a suitable metal, such as an alloy of nickel or tungsten, which, when covered by the glass stream, will be practically indestructible, and from the surface of which the sheet-supplying stream will not absorb, dissolve, or carry off any noticeable amount of oxide or metallic material, and along the surface of which there will be less adhesion of the glass stream. The molten glass flows around both sides of this lower directing member, the two streams uniting at the lower edge of the member and flowing or being drawn downwardly therefrom in sheet form.

Means are provided to individually support the two directing members in adjustable relation with respect to each other and to the source of molten glass, and the directing members are surrounded by suitable means for regulating the temperature of the glass as it passes downwardly therearound prior to the formation of the sheet.

The invention will be more clearly understood from the following detailed description of certain forms of apparatus involving the principles of this invention.

In the accompanying drawings:

Fig. 1 is a longitudinal vertical section through the apparatus, taken substantially on the line 1—1 of Fig. 2.

Fig. 2 is a transverse vertical section taken substantially on the line 2—2 of Fig. 1. This view is on a somewhat smaller scale than Fig. 1.

Fig. 3 is a detail section on an enlarged scale taken substantially on the line 3—3 of Fig. 2.

Fig. 4 is a detail elevation of one of the adjustable supports for the lower directing member.

Fig. 5 is a vertically sectioned detail of a portion of the apparatus showing a somewhat different operation under different temperature conditions.

A body of molten glass 1 is maintained in the extension 2 of the tank furnace in which the molten glass is produced. At the forward end of this tank the glass flows into a pair of similar extensions 3, each having a tapered orifice 4 in its lower wall through which the molten glass may flow downwardly. Extending vertically through the tank extension 3, the molten glass therein, and the opening 4, is a rotatable plug member 5, the lower portion thereof which passes through opening 4 being tapered as at 6 to correspond with the inclination of the walls of the opening. The lower end of plug 5 extends considerably below the openings 4 and terminates in an outwardly flared portion 7 which is normally somewhat below the glass level of the supply of molten glass, maintained in trough 8 in the top of the upper directing member or spill-bar 9, hereinafter described.

The upper portion of member 5 extends vertically through a sleeve 10 and is keyed thereto by a key or feather 11 so that the member 5 may be adjusted vertically through this sleeve 10 but must always rotate therewith. A flange 12 at the upper end of member 5 rests upon a pair of rollers 13 carried in the forked extension 14 at one end of a centrally pivoted lever 15, the other end of this lever being connected with a vertically extending rod 16 adjustably held at its lower end by screw-bolt 17 secured through a fixed bracket at the side of the machine. By suitably adjusting the screw 17, the plug 5 may be adjusted vertically in the opening 4 to vary the thickness of the stream of molten glass flowing down through the opening around the tapered portion of the plug. A bevel-gear 18 at the upper end of sleeve 10 is driven through bevel-gear 19 at one end of a rotatable cross-shaft 20 driven from any suitable source of power, for example through sprocket wheel 21. It will be noted that the adjusting and rotating means for the two plugs 5 are exactly similar, and that both are driven from the same cross-shaft 20.

As noted above, the volume of glass flowing down through the openings 4 around the plugs 5 will be regulated by the vertically adjusted position of these plugs. Also the rotation of these plugs or directing members, as shaped, will give an upwardly urging whirling movement to the glass entering the orifices 4 at the top, and will cause the horizontal stream line advance from different stratums to become more equal in speed and volume, and will act as a mixing means to break up any fixed flow currents or temperature inequalities in the body of molten glass and provide a constant stream of evenly conditioned glass through the openings 4 to the upper directing member 9. As the glass flows down around these plug members, it will be directed outwardly by the flaring lower ends 7 of the plugs into the body of glass in trough 8. In this way the down-flowing molten glass will be eased into place in this lower pool of glass without any violent dropping action and will eliminate the inclusion and carrying of air bubbles into the molten glass in trough 8.

The upper directing member or spill-bar 9 is of a length somewhat greater than the sheet of glass to be produced, and trough or recess 8 in the top thereof extends nearly from end to end of the bar. The lower flared end 7 of the plugs extends into the molten glass near each end of the trough 8. The side walls of the bar extend somewhat above the glass level adjacent the ends of the trough, but throughout the main central portion of the bar the side edges 22 are of such height that the molten glass in trough 8 will flow out or spill over these side edges in thin even streams 23 which flow down around the converging side portions of the bar to unite at the lower edge 24 thereof in the form of a single thick stream 25.

This upper directing member or spill-bar 9 may be made of a suitable refractory material but is preferably formed of a metallic alloy like the lower directing member to be described hereinafter. At each end of the spill-bar a supporting shaft 26 extends out through the side wall 27 of the enclosing chamber and is adjustably secured in a supporting bearing 28 by means of set-screw 29. By loosening set-screw 29 and suitably manipulating the crank handle 30 at the end of shaft 26, the spill-bar may be tilted one way or the other to initially secure and establish like flow paths when starting operation and also to regulate the rate of overflow at either side of the bar and insure the formation of streams 23 of equal volume at each side thereof.

As shown in Fig. 5, the member 9 is formed of refractory material, but has a lower edge 60, preferably formed of an inserted porous metal casting which will be heat-resisting and give greater support to the glass which flows to the lower directing member as hereinafter described.

The directing member 9 acts as a shallow container and distributing member for the downwardly flowing glass and functions to deliver a wide even stream 25 of molten glass to the upper receiving edge of the lower directing member 31. This short downwardly flowing stream of glass 25 between the two directing members has both faces exposed to the heated gases within the enclosing chamber, thus facilitating the temperature control of the glass delivered to the lower directing member 31.

In case the glass flowing from the spill-bar 9 should have high material viscosity or be of lower temperature, the short suspended stream 25 between the member 9 and the upper end of the member 31 will grow in thickness and form a forked sheet-supplying body about as shown in Fig. 5.

This body will become very uniform in temperature and consistency if exposed to a sufficient amount of heat energy and heat radiated from the wall of the heating chamber and will progressively become more fluent in its lower forked reach toward the wider portion of the lower directing member where the stream movement proper will be resumed and quickened.

The main lower directing member 31 will be formed of a suitable heat-resisting metal, preferably an alloy of nickel and tungsten, or some similar material. This metallic member will normally be completely surrounded by the molten glass, so that there is no appreciable exposure to the atmosphere, and there will be practically no oxidation or chemical destruction of the metallic surfaces. Preferably, this member is made hollow as at 32 to reduce the weight, and if found necessary heating means may be employed within this space 32.

The stream of molten glass 25 is received upon the upper edge 33 of member 31, which splits the stream into two thin streams 34 which flow down the rather long, gradually diverging side faces 35 of the member. These faces 35 extend down to the outer corners or ledges 36, from which the side walls slope rather sharply inward as at 37 until they meet at the lower edge 38 of the slab. The molten streams 34 will adhere to and flow slowly down the rather large supporting areas of faces 35, but after rounding the ledges 36 will be drawn down more rapidly along the lower converging walls 37 of the member until the glass streams unite at the lower edge 38 and are drawn downwardly therefrom in the form of glass sheet 39.

The supporting rods or shafts 40 which extend out through the side walls 27 of the enclosing structure are rotatably mounted in bearings 41 adjustable laterally in the supporting bracket 42 by set-screws 43. By suitable manipulation of the crank handle 44, member 31 may be tilted as desired with respect to the vertical plane, and may be fixed in any adjusted position by the set-screw 45. The bracket 42 is slidable vertically between the guides 65, and is supported by the screw-bolt 46, passing through supporting eye 47, and having adjusting nut 48 on the upper end thereof. By means of the adjusting apparatus just described, member 31 may be raised or lowered, moved laterally, or inclined to the vertical as desired. In this way it may be properly positioned below the upper member 9 which feeds the molten glass thereto, so that the streams 34 flowing down the two faces of the member will have an equal volume and velocity.

The two directing members are completely enclosed within a chamber which is heated by any suitable arrangement of burners such as indicated at 49 and 50. Preferably, the lower slab 31 is protected from the direct action of the heaters by the vertically adjustable side slabs or partitions 51 and 52, which will radiate an even moderated heat against the streams 34 flowing down this directing member. These partitions 51 and 52 will, as positioned, direct a greater portion of the heat against the streams of molten glass flowing downwardly around the upper distributing and directing member 9.

The lowermost surface portions of the flowing glass streams, which pass down the lower sides 37 of member 31 to unite at the lower edge 38 and be drawn away in sheet form, are normally given more or less plasticity by the amount of cooling atmosphere which is permitted to pass up through slot 53 at the bottom of the chamber. The rather narrow passages between the ledges 36 and the partitions 51 and 52, as shown, serve to partially cut off the relatively cooler lower portion of the heating chamber from the hotter upper portion. However, if the partitions are raised so as to provide a direct passage for heated gases from the burners 49 and 50 to the ledges 36, the fluency of the glass at these points may be increased. As indicated in Fig. 2, each partition 51 and 52 is supported at each end on a bracket 54 which is vertically adjustable at 55, outside the housing, to regulate the vertical position of the partitions. The tiles or slabs 56, which are adjustable laterally at the lower end of the enclosing structure, adjacent the sides of sheet 39, serve to vary the width of the exit slot 53 and to thereby regulate the amount of heat retained in this lower portion of the chamber.

The upper directing member 9 will deliver the molten glass to the lower member 31 in an even vertical stream, and also acts as a partial support for this stream, thereby decreasing the velocity of flow with which it is delivered to the upper edge 33 of the lower directing member. The molten glass streams do not have as great adhesion with the smooth surface of the lower metallic member, but the comparatively long diverging upper faces of this member offer an increased clinging area which offsets the weaker adhesive properties. As stated above, there will be practically no physical wear or chemical deterioration of the metallic supporting member, and consequently no injurious effects will be imparted to the glass streams flowing thereover.

The amalgamation with or the absorption by the surface glass of the streams, of atomic matter from the combustion atmosphere of the heating space and the slight surface cooling of the glass streams flowing down the converging lower surfaces of member 32 below the ledges 36, will form a superficial skin of greater inherent cohesiveness on these streams, which assumes the greater part of the drawing stress. This tractive force operating through the drawn glass converging below the ledges 36 is communicated to each surface of the streams 34 on the upwardly tapering portion of member 31. This pull on the superficial layer of the surface glass tends to draw it in advance of the remainder of the flow and at a greater speed toward the outermost ledges 36.

As these exterior superficial surface films of glass come under drawing stress and attain a progressive acceleration in the line of draw, before the main body of the slower flowing layer of glass receives such impulse, these films are caused to move downward at a much faster rate than the rest of the glass, progressively accelerating the advance of the adjacent glass or that glass which is subadjacent to the more cohesive superficial surface, so that at the wider reach of the spread flow a certain proportion thereof also becomes considerably accelerated and moves along with the surface layers as they are bending inward toward one another around the laterally projecting side promontories or ledges 36 on the member 31.

The drawing force thus operating on the flared-out portion of the forked flow will speed the downward movement of only a relatively small portion of the flow because of the somewhat dynamic concentric pressure exerted by the more cohesively knitted and tensioned surface films against the more fluid glass of the enfolding or forked flow, which pressure tends to urge this glass inward and upwardly of the upward tapering portion of the member 31, and thereby exerts a sort of an upward squeezing effect on the body of the flow and also magnifies the support given to this glass by each slanting side of the upward taper of the member 31, which altogether in practical effect will enhance the internal support given, and balance the action of gravity on a portion of the glass moving down along each side of the upward taper of the member 31.

In the glass flow thus accelerated and retarded, there will be no occasion for the drawing stress to reach through the flow to the member 9 and thereby drag on the interior surface glass clinging to the faces of this member, and while the flow divided during its descent by the wedge member 31 comes under the influence of the tractive force while traversing the wedge, and is accelerated; the real attenuating stress and stretching action, where the glass movement is resisted by a clinging surface on its inner sides, takes place along the lower taper 37 of the member 31, and mainly below the points 36.

Above the ledges 36, there is a progressively but relatively slow speeding up of the downward glass flow, but below these ledges there is a swifter progressive increase in speed resulting in an immediate sheet formation in which there may thereafter be but very little further stretching if proper support is given to the drawn sheet.

The sheet of glass may be formed beneath the member 31 without any material resistance from the surface of the lower taper 37 of the member 31, if the two glass streams flowing from the ledges 36 to the point 38 are maintained in relatively freely flowing state, and the streams at the same time are kept relatively thin by being reduced in quantity.

The single stream of glass thus forming at the edge point 38 and departing therefrom, will hang as a suspended sheet area through the slot 53, the weight of the sheet area formed acting to stretch the stream to proper sheet thickness.

When the sheet is formed in this manner no drawing force is required, the requirement in this instance being that the sheet be supported and taken away as it is formed. The glass sheet formed in this way will become plastically stable as it emerges through the slot 53 and should preferably be turned and carried horizontally through the leer where it is gradually cooled and then delivered to the cutting table.

In order to maintain the glass streams in a highly fluent state as they form the single stream at point 38, the tiles 56 should be about as shown in Fig. 1, and the tiles 51 and 52 elevated to a higher position.

Claims:—

1. In sheet glass apparatus, an upper container and a lower container, the upper container having an orifice in its bottom and holding a mass of molten glass, a plug member extending loosely downward through the orifice with its lower end submerged in the molten glass supply in the lower container.

2. In sheet glass apparatus, an upper container and a lower container, the upper container having an orifice in its bottom and holding a mass of molten glass, a plug member extending loosely downward through the orifice with its lower end submerged in the molten glass supply in the lower container, and means to continuously rotate the plug.

3. In sheet glass apparatus, an upper container and a lower container, the upper container having an orifice in its bottom and holding a mass of molten glass, a plug member extending loosely downward through the orifice with a flared lower end submerged in the molten glass in the lower container.

4. In sheet glass apparatus, an upper container and a lower container, the upper container having an orifice in its bottom and holding a mass of molten glass, a plug member extending loosely downward through the orifice with a flared lower end submerged in the molten glass in the lower container, and means to continuously rotate the plug.

5. In sheet glass, an upper receptacle and a lower receptacle, the upper receptacle having a tapered orifice in its bottom and holding a mass of molten glass, a correspondingly tapered plug extending downwardly through this orifice with its lower end submerged in the molten glass supply in the lower receptacle.

6. In sheet glass apparatus, an upper receptacle and a lower receptacle, the upper receptacle having a tapered orifice in its bottom and holding a mass of molten glass, a correspondingly tapered plug extending downwardly through this orifice with its lower end submerged in the molten glass supply in the lower receptacle, and means for adjusting the plug vertically.

7. In sheet glass apparatus, an upper receptacle and a lower receptacle, the upper receptacle having a tapered orifice in its bottom and holding a mass of molten glass, a correspondingly tapered plug extending downwardly through this orifice with its lower end submerged in the molten glass supply in the lower receptacle, and means for continuously rotating the plug.

8. In sheet glass apparatus, an upper receptacle and a lower receptacle, the upper receptacle having a tapered orifice in its bottom and holding a mass of molten glass, a correspondingly tapered plug extending downwardly through this orifice with its lower end submerged in the molten glass supply in the lower receptacle, means for continuously rotating the plug, and means for adjusting the plug vertically.

9. In sheet glass apparatus, an upper receptacle and a lower receptacle, the upper receptacle having a tapered orifice in its bottom and holding a mass of molten glass, a correspondingly tapered plug extending downwardly through this orifice with a flared lower end submerged in the molten glass in the lower receptacle.

10. In sheet glass apparatus, an upper receptacle and a lower receptacle, the upper receptacle having a tapered orifice in its bottom and holding a mass of molten glass, a correspondingly tapered plug extending downwardly through this orifice with a flared lower end submerged in the molten glass in the lower receptacle, and means for continuously rotating the plug.

11. In an apparatus for producing sheet glass, a directing member from which molten glass flows in the sheet forming process, the member having a glass receiving recess in its upper surface, and means for feeding a regulated stream of molten glass to this recess, comprising a container for molten glass having a tapered orifice in its bottom, a correspondingly tapered plug extending downwardly through the orific with its lower end submerged in the molten glass supply in the recess, the molten glass flowing down from the container around the plug into the recess.

12. In an apparatus for producing sheet glass, a directing member from which molten glass flows in the sheet forming process, the member having a glass receiving recess in its upper surface, and means for feeding a regulated stream of molten glass to this recess, comprising a container for molten glass having a tapered orifice in its bottom, a correspondingly tapered plug extending downwardly through the orifice with its lower end submerged in the molten glass supply in the recess, the molten glass flowing down from the container around the plug into the recess, and means for rotating the plug.

13. In an apparatus for producing sheet glass, a directing member from which molten glass flows in the sheet forming process, the member having a glass receiving recess in its upper surface, and means for feeding a regulated stream of molten glass to this recess, comprising a container for molten glass having a tapered orifice in its bottom, a correspondingly tapered plug extending downwardly through the orifice with its lower end submerged in the molten glass supply in the recess, the molten glass flowing down from the container around the plug into the recess, and means for raising or lowering the plug to vary the annular flowing space between the plug and the walls of the orifice.

14. In an apparatus for producing sheet glass, a directing member from which molten glass flows in the sheet forming process, the member having a glass receiving recess in its upper surface, and means for feeding a regulated stream of molten glass to this recess, comprising a container for molten glass having a tapered orifice in its bottom, a correspondingly tapered plug extending downwardly through the orifice with its lower end submerged in the molten glass supply in the recess, the molten glass flowing down from the container around the plug into the recess, means for raising or lowering the plug to vary the annular flowing space between the plug and the walls of the orifice, and means for rotating the plug.

15. In an apparatus for producing sheet glass, a directing member from which molten glass flows in the sheet forming process, the member having a glass receiving recess in its upper surface, and means for feeding molten glass to the recess, comprising a container having an orifice in its bottom, and a plug extending downwardly through the orifice with its lower end submerged in the molten glass in the recess, the molten glass flowing down from the container around the plug into the recess.

16. In an apparatus for producing sheet glass, a directing member from which molten glass flows in the sheet forming process, the member having a glass receiving recess in its upper surface, and means for feeding molten glass to the recess, comprising a container having an orifice in its bottom, and a plug extending downwardly through the orifice with its lower end submerged in the molten glass in the recess, the molten glass flowing down from the container around the plug into the recess, and means for rotating the plug.

17. In apparatus for producing sheet glass, a pair of directing members, spaced one above the other, around which molten glass successively flows before being drawn into sheet form from the bottom of the lower member, the upper member having a glass receiving recess in its upper surface from which the molten glass spills down each side wall of the member.

18. In apparatus for producing sheet glass, a pair of metallic directing members, spaced one above the other, around which molten glass successively flows before being drawn into sheet form from the bottom of the lower member, the upper member having a glass receiving recess in its upper surface from which the molten glass spills down each side wall of the member.

19. In apparatus for producing sheet glass, a pair of directing members, spaced one above the other, around which molten glass successively flows before being drawn into sheet form from the bottom of the lower member, the upper member having a glass receiving recess in its upper surface from which the molten glass spills down each side wall of the member, the lower member having an upper edge for splitting the molten stream received from the upper member, and a lower edge where the glass streams flowing around the member reunite to form the sheet.

20. In apparatus for producing sheet glass, a pair of directing members, spaced one above the other, around which molten glass successively flows before being drawn into sheet form from the bottom of the lower member, the upper member being in the form of a shallow container for molten glass which overflows around the side walls of the container to form a single stream which is received upon the lower member.

21. In apparatus for producing sheet glass, a pair of directing members, spaced one above the other, around which molten glass successively flows before being drawn into sheet form from the bottom of the lower member, the upper member having a glass receiving recess in its upper surface from which the molten glass spills down each side wall of the member, and means for feeding a regulated stream of molten glass to the recess.

22. In apparatus for producing sheet glass, a pair of directing members, spaced one above the other, around which molten glass successively flows before being drawn into sheet form from the bottom of the lower member, the upper member having a glass receiving recess in its upper surface from which the molten glass spills down each side wall of the member, and means for feeding regulated streams of molten glass to each end of the recess.

23. In apparatus for producing sheet glass, a pair of directing members, spaced one above the other, around which molten glass successively flows before being drawn into sheet form from the bottom of the lower member, the upper member being in the form of a shallow container for molten glass which overflows around the side walls of the container to form a single stream which is received upon the lower member, the lower edge of the container from which the glass flows to the lower member being formed of a porous metal.

24. The method of forming a continuous sheet area of glass which consists in flowing the glass, which is to compose the sheet, over the ramparts of a channel in a horizontally extended bar to a point of confluence beneath the bar, separating and causing the said glass to move in a spreading fashion in opposite directions laterally, and thereafter convergingly to a second point of confluence while flowing it downward, and forming the sheet area by exerting a continuous stretching pull of constant predetermined magnitude on the glass along its second point of confluence.

25. The method of forming a continuous sheet area of glass which consists in flowing the glass, which is to compose the sheet, over the ramparts of a channel in a horizontally extended bar to a point of confluence beneath the bar, separating and causing the said glass to move in a spreading fashion in opposite directions laterally, and thereafter convergingly to a second point of confluence while flowing it downward, and forming the sheet area by exerting a continuous stretching pull of constant predetermined magnitude on the glass along its second point of confluence, while reducing its yieldability beneath said point.

26. The method of forming a sheet of glass which consists in suspending a body of molten glass between spaced upper and lower rigid supports, in maintaining the quantity of the body by a plural stream overflow from a supply in the upper support, in discharging twin streams from the body over the exterior of the lower support, in increasing the fluency of the glass comprising the discharging streams, and in merging said streams and forming a descending sheet area at the lower end of the lower support.

27. The method of forming a sheet of glass which consists in suspending a body of molten glass between spaced upper and lower rigid supports, in maintaining the quantity of the body by a plural stream overflow from a supply in the upper support, in discharging twin streams from the body over the exterior of the lower support, in increasing the fluency of the glass comprising the discharging streams, in merging said streams and forming a descending sheet area at the lower end of the lower support, and in imparting plastic stability to the glass of the sheet area by slightly cooling the exterior of the twin streams as they approach their merging point.

28. The method of producing a sheet of glass which consists in suspending a body of molten glass between an upper and a lower rigid support to which the glass of said body will cling, in maintaining the quantity of the body by flowing glass to the opposite sides thereof from a supply in the upper support, in discharging twin streams from the body over the exterior of the lower support, in progressively increasing the fluency of the glass comprising the discharging streams by heating as they proceed on the lower support, and in merging said streams and forming a descending sheet area at the lower end of the lower support.

29. The method of producing a sheet of glass which consists in suspending a body of molten glass between spaced upper and lower rigid supports to which the glass of said body will cling, in maintaining a quantity of the body by flowing glass to the opposite sides thereof from a supply in the upper support, in discharging twin streams from the body over the exterior of the lower support, in progressively increasing the fluency of the glass comprising the discharging streams by heating as they proceed on the lower support, in merging said streams and forming a descending sheet area at the lower end of the lower support, and in imparting plastic stability to the glass of the sheet area by cooling the exterior of the streams at their merging point.

30. The method of handling and treating molten glass from which a sheet is to be produced which consists in flowing the glass from the refining end of a melting furnace through separate downwardly leading passages into the opposite ends of a channel in a horizontally positioned spill-bar, in giving internal support and imparting a spreading movement to the glass as it is being deposited while flowing it horizontally from its point of deposit to fill the channel.

31. The method of handling and treating molten glass from which a sheet is to be produced which consists in flowing the glass from the refining end of a melting furnace through separate downwardly leading passages into the opposite ends of a channel in a horizontally positioned spill-bar, in giving internal support and imparting a spreading movement to the glass as it is being deposited while flowing it horizontally from its point of deposit to fill the channel, and in causing a predetermined quantity of downward overflow of glass from the channel along the sides of the bar by regulating the quantity movement of the glass through the passages.

32. The method of treating molten glass from which a sheet is to be produced as it is advancing to form a source for the sheet, which consists in advancing the glass horizontally from the melting furnace into separately spaced orificial passages and vertically through said passages, and in imparting a horizontal rotational component of movement to the advancing glass above, in and below each of said orificial passages.

33. The method of passing a supplying stream of glass downwardly from an upper to a separate lower body of glass, which consists in giving an upwardly urging vortexal movement to the different stratums of the upper body adjacent the point of formation of the stream, and in giving internal support to the falling stream while imparting a rotational component of movement thereto.

34. The method of passing a supplying stream of glass downwardly from an upper to a separate lower body of glass, which consists in giving an upwardly urging vortexal movement to the different stratums of the upper body adjacent the point of formation of the stream, in giving internal support to the falling stream while imparting a rotational component of movement thereto, and in giving rigid under support to the terminating point of the stream.

35. The method of passing a supplying stream of glass downwardly from an upper to a separate lower body of glass, which consists in giving an upwardly urging vortexal movement to the different stratums of the upper body adjacent the point of formation of the stream, in giving internal support to the falling stream with a rigid member while imparting a rotational component of movement to said member, and in supporting the lower end of the stream on a flaring rigid part integral with the internal support.

36. The method of delivering a stream of molten glass in a state of homogeneous consistent fluidity from a supply through a downwardly leading orifice into a pool of molten glass without surface lapping or inclusion of air, which consists in causing the different stratums which feed the stream to approach and enter the orifice along a circuitous path in stream lines leading diagonally downward, in passing the thus actuated streams of glass through the orifice into the underlying pool while supporting the same internally in and below the orifice, and in causing the glass of the stream to spread and flow diagonally outward as it merges with the upper stratum of glass in the pool.

37. In sheet glass apparatus, a plurality of containers, the upper one having an orifice in its bottom containing a mass of molten glass, and a rotatable plug for controlling the flow of glass through the orifice.

Signed at Toledo, in the county of Lucas and State of Ohio, this 14th day of October, 1925.

ENOCH T. FERNGREN.